(12) United States Patent
Gault et al.

(10) Patent No.: US 7,532,708 B2
(45) Date of Patent: May 12, 2009

(54) REMOTE INITIATION OF THREE-WAY CALLING AT A TELEMATICS UNIT

(75) Inventors: Thomas A. Gault, Troy, MI (US); Bruce A. Groskreutz, Grand Blanc, MI (US); Kevin R. Krause, Northville, MI (US)

(73) Assignee: General Motors Corporation, Detroit, MI (US)

( * ) Notice: Subject to any disclaimer, the term of this patent is extended or adjusted under 35 U.S.C. 154(b) by 884 days.

(21) Appl. No.: 11/038,936

(22) Filed: Jan. 20, 2005

(65) Prior Publication Data

US 2006/0159234 A1 Jul. 20, 2006

(51) Int. Cl.
H04M 11/00 (2006.01)

(52) U.S. Cl. .................... 379/37; 379/106.01

(58) Field of Classification Search .......... 379/37, 379/40, 45, 102.01, 102.02, 106.01
See application file for complete search history.

(56) References Cited

U.S. PATENT DOCUMENTS

| 5,815,550 | A | 9/1998 | Miller | 379/37 |
| 5,896,565 | A | 4/1999 | Miller | 455/404 |
| 6,366,646 | B1 | 4/2002 | Miller | 379/40 |

Primary Examiner—Stella L Woo

(57) ABSTRACT

A method for operating three-way calling for a telematics unit including establishing a first connection between a call center and the telematics unit based on a trouble call request, sending call instructions from the call center to the telematics unit via the first connection based on the trouble call request and establishing a second connection from the telematics unit to one of the call center or a contact-problem number associated with the trouble call request based on the call instructions.

18 Claims, 2 Drawing Sheets

US 7,532,708 B2

REMOTE INITIATION OF THREE-WAY CALLING AT A TELEMATICS UNIT

FIELD OF THE INVENTION

This invention relates generally to remotely initiated control of a telematics unit. In particular, the invention relates to remotely establishing a three-way call from a telematics unit at a call center.

BACKGROUND OF THE INVENTION

The opportunity to personalize features in a mobile vehicle is ever increasing as the automobile is being transformed into a communications and entertainment platform as well as a transportation platform. Many new cars will be equipped with a telematics unit to provide wireless communication and location-based services. These services may be accessed through interfaces, such as voice-recognition computer applications, touch-screen computer displays, computer keyboards, or a series of buttons on the dashboard or console of a vehicle.

Currently, telematics service call centers establish a voice or data communication channel between a telematics unit and the call center to provide various types of location services, including dispatch of emergency help to a vehicle when air bags deploy, stolen vehicle tracking, traffic information, weather reports, road condition information, accident updates, street routing, and business finders.

If there is a technical problem within the telematics unit, the user contacts the call center and informs them of the problem. In order to fix the problem, technical personnel at the call center work with the user to determine the source of the problem. The user is required to place calls from the telematics unit for the technical personnel. The technical personnel may ask the user to pull off the road and to make one or more calls from the telematics unit as part of the troubleshooting process. The troubleshooting process may be an inconvenience to the user and the technical personnel may be limited to troubleshooting when the user is unavailable to assist them in the process. In many instances, a telematics unit is unable to initiate a three-way call.

It would be desirable to provide remote initiation of three-way calling at a telematics unit that overcomes the above disadvantages.

SUMMARY OF THE INVENTION

One aspect of the present invention provides a method for operating three-way calling for a telematics unit including establishing a first connection between a call center and the telematics unit based on a trouble call request, sending call instructions from the call center to the telematics unit via the first connection based on the trouble call request and establishing a second connection from the telematics unit to one of the call center or a contact-problem number associated with the trouble call request based on the call instructions.

A second aspect of the present invention provides a computer readable medium storing a computer program including computer readable code operable for establishing a first connection between a call center and a telematics unit based on a trouble call request, for sending call instructions from the call center to the telematics unit via the first connection based on the trouble call request and for establishing a second connection from the telematics unit to one of the call center or a contact-problem number associated with the trouble call request based on the call instructions.

A third aspect of the present invention provides a system for operating three-way calling for a telematics unit. The system includes means for establishing a first connection between a call center and the telematics unit based on a trouble call request, means for sending call instructions from the call center to the telematics unit via the first connection based on the trouble call request and means for establishing a second connection from the telematics unit to one of the call center or a contact-problem number associated with the trouble call request based on the call instructions.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

Various embodiments of the present invention are illustrated by the accompanying figures, wherein.

DETAILED DESCRIPTION OF THE PRESENTLY PREFERRED EMBODIMENTS

Figure 1:
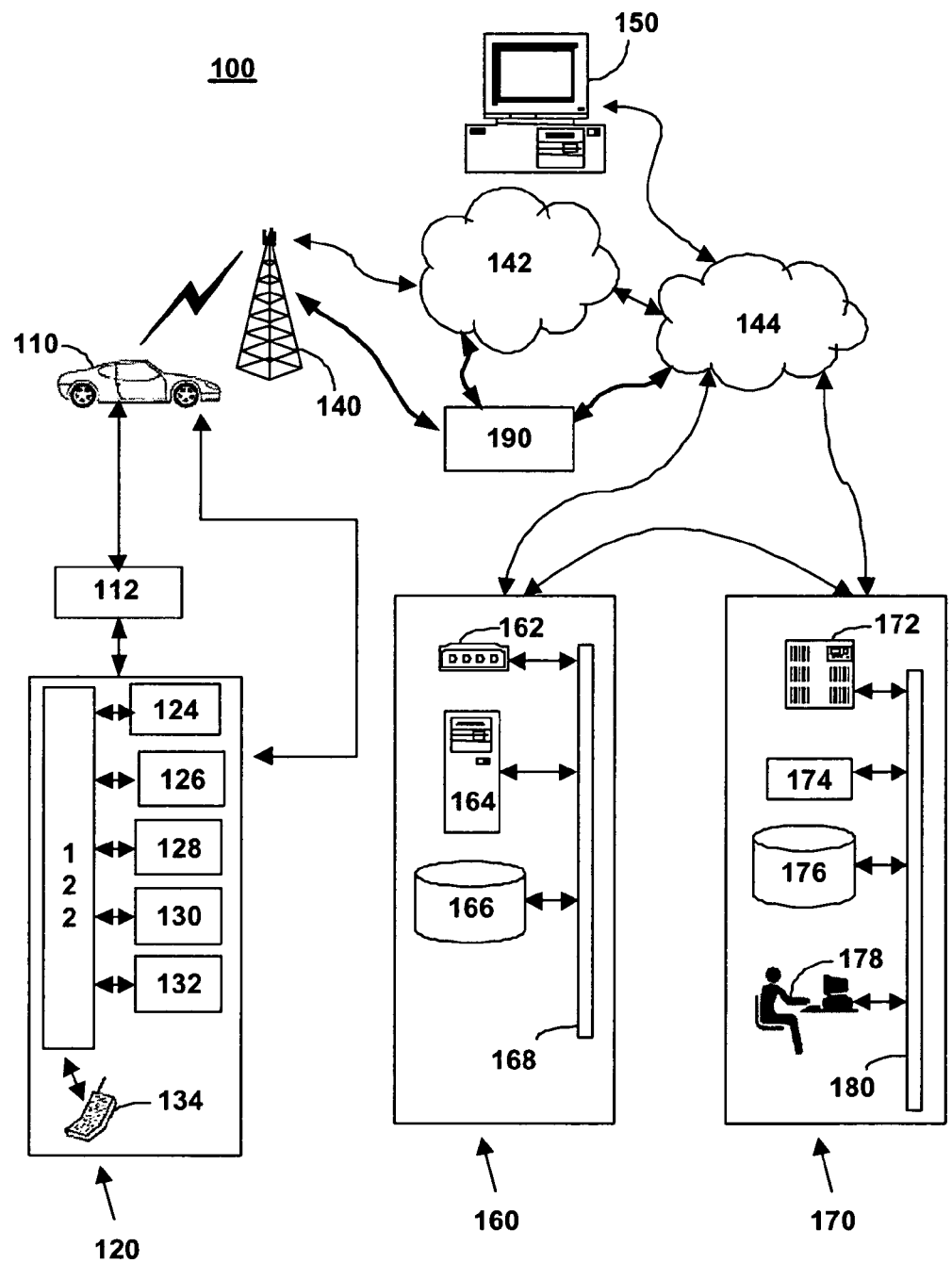
FIG. 1 is a schematic diagram of a system for providing access to a telematics system in a mobile vehicle.

FIG. 1 illustrates one embodiment of system for data transmission over a wireless communication system, in accordance with the present invention at 100. Mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more service providers 190, one or more client, personal or user computers 150, one or more web-hosting portals 160, and/or one or more call centers 170. In one embodiment, the service providers 190 are included in the one or more wireless carrier systems 140, one or more communication networks 142, one or more land networks 144. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 may also be referred to as a mobile vehicle throughout the discussion below. In operation, MVCU 110 may be implemented as a motor vehicle, a marine vehicle, or as an aircraft. MVCU 110 may include additional components not relevant to the present discussion.

Vehicle communication network 112 sends signals between various units of equipment and systems (detailed below) within MVCU 110 to perform various functions, such as unlocking a door, opening the trunk, setting personal comfort settings, and calling from telematics unit 120. In facilitating interactions among the various communication and electronic modules, vehicle communication network 112 utilizes network interfaces, such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and a network access device 134, such as an embedded or in-vehicle mobile phone. In other embodiments, telematics unit 120 may be implemented without one or more of the above listed components, such as a microphone 130 or speakers 132. Telematics unit 120 may include additional components not relevant to the present discussion.

Processor 122 is implemented as a microcontroller, microprocessor, controller, host processor, or vehicle communications processor. In one embodiment, processor 122 is a digital signal processor (DSP). In one example, processor 122 is implemented as an application specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). Network access device 134 is a cellular-type communication device, such as an analog, digital, dual-mode, dual-band, multi-mode or multi-band cellular phone.

Processor 122 executes various computer programs that control programming and operational modes of electronic and mechanical systems within MVCU 110. Processor 122 controls communications, e.g., call signals between telematics unit 120, wireless carrier system 140, and call center 170. In one embodiment, a voice-recognition application is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers. In this embodiment, signals from processor 122 are translated into voice messages and sent out through speaker 132.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal or user computer 150 includes a computer usable medium to execute Internet browser and Internet-access computer programs for sending and receiving data over land network 144 and, optionally, wired or wireless communication networks 142 to web-hosting portal 160. Personal or client computer 150 sends user preferences to web-hosting portal through a web-page interface using communication standards, such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user-preferences for MVCU 110. User-preference data from client-side software is transmitted to server-side software of web-hosting portal 160. User-preference data is stored at web-hosting portal 160.

Web-hosting portal 160 includes one or more modems 162, one or more web servers 164, one or more databases 166, and a network system 168. Web-hosting portal 160 is connected directly by wire to call center 170, or connected by phone lines to land network 144, which is connected to call center 170. In one example, web-hosting portal 160 is connected to call center 170 utilizing an IP network. In this example, both components (web-hosting portal 160 and call center 170) are connected to land network 144 utilizing the IP network. In another example, web-hosting portal 160 is connected to land network 144 by one or more modems 162. Land network 144 sends digital data to and from modem 162, and the digital data is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components, such as database 166. In one example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180. The communication services advisors 178 can be a single advisor.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisors 178 data transmissions via network system 180. Communication services advisors 178 receive from or send to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 through wireless carrier system 140, communication network 142, land network 144, voice and data switch 172, and network system 180. Communication services manager 174 stores or retrieves data and information from communication services database 176. Communication services manager 174 may provide requested information to communication services advisors 178.

In one embodiment, communication services advisors 178 are implemented as real advisors. In an example, a real advisor is a human being in verbal communication with a user or subscriber, e.g., a client, in MVCU 110 via telematics unit 120. In another embodiment, communication services advisors 178 are implemented as virtual advisors. In an example, a virtual advisor is implemented as a synthesized voice interface responding to requests from telematics unit 120 in MVCU 110.

Communication services advisors 178 provide services via telematics unit 120. Services provided by communication services advisors 178 include enrollment services, navigation assistance, real-time traffic advisories, directory assistance, roadside assistance, business or residential assistance, information services assistance, emergency assistance, and communications assistance. Communication services advisors 178 communicate with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

Figure 2:
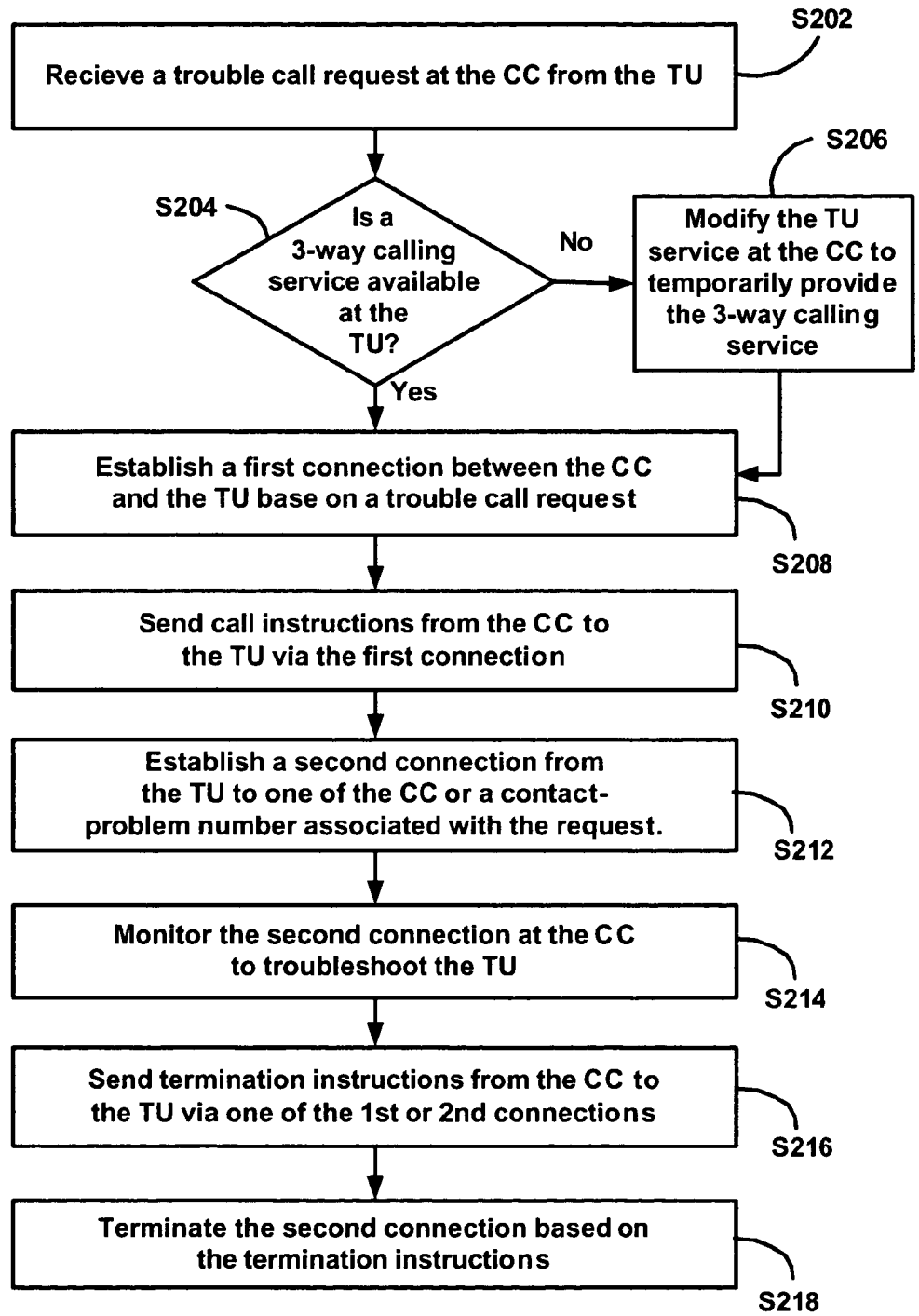
FIG. 2 is a flowchart of a method representative of a method of operating three-way calling for a vehicle telematics unit in accordance with the present invention.

FIG. 2 is a flowchart of a method 200 representative of a method of operating three-way calling for a vehicle telematics unit 120 in accordance with the present invention. In method 200, the call center 170 establishes three-way calling connections from a telematics unit 120, so that communication services advisors 178 in the call center 170 can monitor connections made from the telematics unit 120 in a troubleshooting process. The call center 170, the communication services managers 174, the telematics unit 120, the processor 122, the in-vehicle memory 128, and the service providers 190 have stored in computer readable medium at least one computer program including computer readable code to perform the operations described with reference to method 200.

During stage S202, the call center (CC) 170 receives a trouble call request from the telematics unit (TU) 120. The user of the MVCU 110 places the trouble call request after experiencing difficulty with a function of the telematics unit 120. One exemplary difficulty is an inability to connect the telematics unit 120 with a specific phone number or a set of phone numbers. These specific phone numbers or sets of phone numbers are referred to herein as contact-problem numbers. Another exemplary difficulty is a problem with a particular function of the telematics unit 120, such as an inability to place an emergency request to the call center 170 by pushing the emergency button.

In one example, the user problem is an inability to place a non-emergency call from the telematics unit 120 to the call center 170. The user initiates the trouble call request, in this case, by pressing the emergency button in the telematics unit 120 to utilize cleared numbers to place the trouble call request from the telematics unit 120 to the call center 170.

The trouble call request is sent from the telematics unit 120 to the call center 170 via one or more wireless carrier systems 140, one or more communication networks 142, and/or one or more land networks 144. In one embodiment, the trouble call request is sent from a personal or user computer 150 to the call center 170 via one or more wireless carrier systems 140, one or more communication networks 142, one or more land networks 144, and/or one or more web-hosting portals 160.

During stage S204, communication services advisors 178 at the call center 170 respond to the trouble call request by determining if a three-way calling service is available at the telematics unit (TU) 120. The communication services advisors 178 can maintain the connection to the user in the telematics unit 120 while making this determination. In an alternative embodiment, the communication services advisors 178 terminate the connection to the user in the telematics unit 120 before making this determination.

The communication services advisors 178 can be one or more technical personnel with the knowledge and experience to troubleshoot problems related to telematics units 120 and communication systems, including wireless carrier systems 140, communication networks 142, and land networks 144.

To make the determination as to whether three-way calling service is available, communication services advisors 178 establish a connection with the service provider 190 and ask if three-way calling service is available at the telematics unit (TU) 120. The service provider 190 retrieves the relevant information from a database in a public switch (not shown). The service provider 190 communicates with and controls the public switch. The public switch can be included in the one or more wireless carrier systems 140, the one or more communication networks 142, or the one or more land networks 144. In one embodiment, the communication services advisors 178 check one or more communication services databases 176 in the call center 170 to determine if the user elected the three-way calling service option for the telematics unit 120.

If it is determined during stage S204 that three-way calling service is not available and enabled at the telematics unit 120, the call center (CC) 170 modifies the telematics unit (TU) service at stage S206 to temporarily provide the three-way calling service at the telematics unit 120. The call center 170 submits a request to the service provider 190 to modify the public switch to enable three-way calling service at the telematics unit 120. In response to the modification request, the service provider 190 applies program instructions to modify the public switch to temporarily enable the three-way calling service at the telematics unit 120.

In one embodiment, the three-way calling service is only enabled for a predetermined period of time. In another embodiment, the three-way calling service is enabled until the service provider 190 receives a request from the call center 170 to terminate three-way calling service at the telematics unit 120, at which time the service provider 190 applies program instructions to modify the public switch to prevent three-way calling service at the telematics unit 120.

After the call center 170 modifies the telematics unit service to temporarily provide the three-way calling service at the telematics unit 120 at stage S206, the method 200 proceeds to stage S208. If it is determined during stage S204 that three-way calling service is available and enabled at the telematics unit 120, the method 200 proceeds directly to stage S208.

During stage S208, the call center 170 establishes a first connection between the telematics unit 120 and the call center 170 based on the trouble call request placed during stage S202. If the communication services advisors 178 maintained the connection to the user in the telematics unit 120 while making the determination of stage S204, the first connection is the connection that was established by the user to place the trouble call request.

If the communication services advisors 178 terminated the connection to the user in the telematics unit 120 before or while making the determination of stage S204, the first connection is a separate connection from the connection on which the call center 170 received the trouble call request from the telematics unit 120. The first connection is established between the call center 170 and the telematics unit 120 via one or more wireless carrier systems 140, one or more communication networks 142, and/or one or more land networks 144.

During stage S210, the call center (CC) 170 sends call instructions to the telematics unit (TU) 120 via the first connection. The communication services advisors 178 generate the particular call instructions in response to the trouble call request. The call instructions are transmitted using data mode and include the contact-problem number and/or telematics unit function to test. The call instructions include instructions for the telematics unit 120 to establish a three-way call in which the first connection is one of the connections in the three-way call. The instructions for executing the call are typically stored in the in-vehicle memory 128.

During stage S212, the call instructions are executed to establish a second connection from the telematics unit (TU) 120 to the call center (CC) 170 or another location at the contact-problem number associated with the trouble call request.

Various call instructions to be executed by the telematics unit 120 are provided as appropriate for particular difficulties. When the user experienced difficulty with a function of the telematics unit 120, the call instructions have the telematics unit 120 open a second connection with the call center 170 to re-enact the problem function. When the difficulty at the telematics unit 120 is a non-responsive emergency button, the call instructions instruct the telematics unit 120 to out-pulse the emergency number to establish the second connection. When the difficulty is an inability to open a connection with the call center 170 by pushing a particular button that is supposed to be operable to open a connection with the call center 170, the call instructions instruct the telematics unit 120 to out-pulse the subscriber number to establish the second connection with the call center 170. When the difficulty is an inability to connect with a specific contact-problem number, the call instructions instruct the telematics unit 120 to out-pulse the specific contact-problem number to establish the second connection. Other call instructions are possible.

In one embodiment, the three-way calling is enabled for a mobile dial number of a network access device 134, such as an embedded or in-vehicle mobile phone in the telematics unit 120.

During stage S214, the communication services advisors 178 in the call center (CC) 170 monitor the second connection to troubleshoot the telematics unit (TU) 120. From the call center 170, the communication services advisors 178 can hear the outcome of the second connection including cell messages or successful carrier tones.

In one embodiment, a second set of call instructions are sent from the call center 170 to the telematics unit 120 after the communication services advisors 178 have monitored the second connection established in response to the first set of call instructions. The communication services advisors 178 then monitor the second connection established in response to the second set of call instructions. Additional sets of call instructions can be sent from the call center 170 to the telematics unit 120 as required.

During stage S216, the call center (CC) 170 sends termination instructions to the telematics unit (TU) 120 via one of the first or second connections. When the second connection was established between the telematics unit 120 and the call center 170, the second connection can be used to transmit the termination instructions to the telematics unit 120. The termination instructions are sent after the communication services advisors 178 have completed monitoring of the one or more second connections. The termination instructions direct the processor 122 to terminate a three-way call from the telematics unit 120. The instructions for executing the termination instructions are stored in the in-vehicle memory 128. During stage S218, the telematics unit 120 terminates the second connection based on the termination instructions sent from the call center 170 during stage S216.

While the embodiments, of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for operating three-way calling for a telematics unit, the method comprising:

establishing a first connection between a call center and the telematics unit based on a trouble call request;

sending call instructions from the call center to the telematics unit via the first connection based on the trouble call request;

establishing a second connection from the telematics unit to one of the call center or a contact-problem number associated with the trouble call request based on the call instructions; and monitoring the second connection at the call center to troubleshoot the telematics unit.

2. The method of claim 1, further comprising: receiving the trouble call request at the call center from the telematics unit via a separate connection.

3. The method of claim 1, wherein the establishing a first connection comprises maintaining a communication connection transmitting the trouble call request.

4. The method of claim 1, wherein the establishing a first connection comprises establishing the first connection based on a determination of whether three-way calling service is available.

5. The method of claim 4, further comprising: modifying telematics unit service at the call center to temporarily provide the three-way calling service based on the determination.

6. The method of claim 1, further comprising:

sending termination instructions from the call center to the telematics unit via one of the first or second connections; and terminating the second connection based on the termination instructions.

7. The method of claim 1, wherein the call instructions are transmitted using data mode and include at least one of the contact-problem number and a telematics unit function to test.

8. The method of claim 1, wherein the three-way calling is enabled for a mobile dial number of the telematics unit.

9. A computer readable medium storing a computer program comprising:

computer readable code for establishing a first connection between a call center and the telematics unit based on a trouble call request;

computer readable code for sending call instructions from the call center to the telematics unit via the first connection based on the trouble call request;

computer readable code for establishing a second connection from the telematics unit to one of the call center or a contact-problem number associated with the trouble call request based on the call instructions;

computer readable code for sending termination instructions from the call center to the telematics unit via one of the first or second connection to terminate the second connection; and computer readable code for terminating the second connection based on the termination instructions.

10. The medium of claim 9, further comprising: computer readable code for receiving the trouble call request at the call center from the telematics unit via a separate connection.

11. The medium of claim 9, wherein the computer readable code for establishing a first connection comprises computer readable code for maintaining a communication connection transmitting the trouble call request.

12. The medium of claim 9, wherein the computer readable code for establishing a first connection comprises computer readable code for establishing the first connection based on a determination of whether three way calling service is available.

13. The medium of claim 12, further comprising: computer readable code for modifying the telematics unit service at the call center to temporarily provide the three-way calling service based on the determination.

14. The medium of claim 9, further comprising: computer readable code for monitoring the second connection at the call center to troubleshoot the telematics unit.

15. A system for operating three-way calling for a telematics unit, the system comprising:

means for establishing a first connection between a call center and the telematics unit based on a trouble call request;

means for sending call instructions from the call center to the telematics unit via the first connection based on the trouble call request; and means for establishing a second connection from the telematics unit to one of the call center or a contact-problem number associated with the trouble call request based on the call instructions; and means for modifying telematics unit service at the call center to temporarily provide three-way calling service based on a determination of whether the three way calling service is available.

16. The system of claim 15, further comprising: means for receiving the trouble call request at the call center from the telematics unit via a separate connection.

17. The system of claim 15, further comprising: means for monitoring the second connection at the call center to troubleshoot the telematics unit.

18. The system of claim 15, further comprising: means for sending termination instructions from the call center to the telematics unit via one of the first or second connection to terminate the second connection; and means for terminating the second connection based on the termination instructions.

* * * * *